(12) United States Patent
Li et al.

(10) Patent No.: US 11,758,429 B2
(45) Date of Patent: *Sep. 12, 2023

(54) SYSTEM FOR IMPLEMENTING MULTIPLE RADIO ACCESS NETWORKS (RANS) CONVERGENCE AND METHOD THEREOF

(71) Applicant: Huawei Technologies Co., Ltd., Shenzhen (CN)

(72) Inventors: Bingzhao Li, Beijing (CN); Yanyan Chen, Shenzhen (CN); Chunchun Lv, Shenzhen (CN); Qucai Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,918

(22) Filed: Dec. 1, 2021

(65) Prior Publication Data
US 2022/0167204 A1 May 26, 2022

Related U.S. Application Data

(63) Continuation of application No. 16/724,808, filed on Dec. 23, 2019, now Pat. No. 11,218,903, which is a (Continued)

(30) Foreign Application Priority Data

Jul. 26, 2010 (CN) .......................... 201010246658.2

(51) Int. Cl.
*H04W 28/02* (2009.01)
*H04W 76/10* (2018.01)
(Continued)

(52) U.S. Cl.
CPC ....... *H04W 28/0268* (2013.01); *H04W 24/10* (2013.01); *H04W 28/18* (2013.01);
(Continued)

(58) Field of Classification Search
None
See application file for complete search history.

(56) References Cited

U.S. PATENT DOCUMENTS 6,889,050 B1 5/2005 Willars et al.
7,362,726 B2 4/2008 Petrovic et al.
(Continued)

FOREIGN PATENT DOCUMENTS

CN 1783876 A 6/2006
CN 1839653 A 9/2006
(Continued)

OTHER PUBLICATIONS

U.S. Appl. No. 16/724,808, filed Dec. 23, 2019.
(Continued)

*Primary Examiner* — Hong Shao
(74) *Attorney, Agent, or Firm* — Leydig, Voit & Mayer, Ltd.

(57) ABSTRACT

Provided are a system for implementing multiple Radio Access Networks (RANs) convergence and a method thereof. The method includes: an anchor RAN establishes a connection with a User Equipment (UE); the anchor receives a RAB establishment request from a Core Network (CN); the anchor RAN selects an auxiliary RAN; the anchor RAN sends quality of service (QoS) parameters to the auxiliary RAN, so that the auxiliary RAN establishes a connection with the UE according to the QoS parameters, while the anchor RAN keep the connection with the UE. With the methods provided in embodiments for the present disclosure, multiple RANs convergence is implemented, and the
(Continued)

UE establishes connections with the anchor RAN and the auxiliary RAN at the same time, so as to improve the peak rate of the UE.

26 Claims, 11 Drawing Sheets

Related U.S. Application Data continuation of application No. 15/374,847, filed on Dec. 9, 2016, now Pat. No. 10,555,206, which is a continuation of application No. 13/750,233, filed on Jan. 25, 2013, now Pat. No. 9,560,547, which is a continuation of application No. PCT/CN2011/074791, filed on May 27, 2011.

(51) Int. Cl.
  *H04W 28/18* (2009.01)
  *H04W 48/18* (2009.01)
  *H04W 76/25* (2018.01)
  *H04W 24/10* (2009.01)

(52) U.S. Cl.
  CPC ........... *H04W 48/18* (2013.01); *H04W 76/10* (2018.02); *H04W 76/25* (2018.02)

(56) References Cited

U.S. PATENT DOCUMENTS

| | | | |
|---|---|---|---|
| 7,539,160 B2 | 5/2009 | Mrtanen et al. | |
| 2003/0223450 A1 | 12/2003 | Bender et al. | |
| 2005/0043050 A1 | 2/2005 | Lee et al. | |
| 2007/0021120 A1 | 1/2007 | Flore et al. | |
| 2007/0207770 A1 | 9/2007 | Ikaheimo et al. | |
| 2008/0069088 A1* | 3/2008 | Petrovic | H04W 36/22 370/354 |
| 2008/0220787 A1 | 9/2008 | Stanwood et al. | |
| 2009/0316664 A1 | 12/2009 | Wu | |
| 2010/0091653 A1* | 4/2010 | Koodli | H04W 36/0027 370/235 |
| 2010/0128697 A1* | 5/2010 | Choi-Grogan | H04W 36/0044 370/332 |
| 2012/0115436 A1 | 5/2012 | Dai et al. | |
| 2012/0202500 A1 | 8/2012 | Wu | |
| 2012/0307741 A1 | 12/2012 | Wu | |
| 2013/0153298 A1 | 6/2013 | Pietraski et al. | |

FOREIGN PATENT DOCUMENTS

| | | |
|---|---|---|
| CN | 101516066 A | 8/2009 |
| CN | 101616411 A | 12/2009 |
| CN | 101626596 A | 1/2010 |
| CN | 101720117 A | 6/2010 |
| CN | 101730179 A | 6/2010 |
| CN | 101945435 A | 1/2011 |
| CN | 101965064 A | 2/2011 |
| EP | 1693994 A1 | 8/2006 |
| EP | 2170002 A2 | 3/2010 |
| WO | 2010022374 A1 | 2/2010 |
| WO | 2011067459 A1 | 6/2011 |
| WO | 2011159215 A1 | 12/2011 |

OTHER PUBLICATIONS

U.S. Appl. No. 15/374,847, filed Dec. 9, 2016.
U.S. Appl. No. 13/750,233, filed Jan. 25, 2013.
Ahmed et al., "Multi Access Data Network Connectivity and IP Flow Mobility in Evolved Packet System (EPS)," IEEE Wireless Communications and Networking Conference, XP031706546, Institute of Electrical and Electronics Engineers, New York, New York (2010).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300, V10.0.0, pp. 1-183, 3rd Generation Partnership Project, Valbonne, France (Jun. 2010).
"3rd Generation Partnership Project; Technical Specification Group Radio Access Network; Evolved Universal Terrestrial Radio Access (E-UTRA); Radio Resource Control (RRC); Protocol specification (Release 9)," 3GPP TS 36.331, V9.3.0, pp. 1-250, 3rd Generation Partnership Project, Valbonne, France (Jun. 2010).
"3rd Generation Partnership Project; Technical Specification Group Radio Access Network; Evolved Universal Terrestrial Radio Access Network (E-UTRAN); S1 Application Protocol (S1AP) (Release 9)," 3GPP TS 36.413, V9.3.0, pp. 1-241, 3rd Generation Partnership Project, Valbonne, France (Jun. 2010).
"3rd Generation Partnership Project; Technical Specification Group Radio Access Network; Evolved Universal Terrestrial Radio Access Network (E-UTRAN); X2 application protocol (X2AP) (Release 9)," 3GPP TS 36.423, V9.3.0, pp. 1-121, 3rd Generation Partnership Project, Valbonne, France (Jun. 2010).
"3rd Generation Partnership Project; Technical Specification Group Services and System Aspects; General Packet Radio Service (GPRS) enhancements for Evolved Universal Terrestrial Radio Access Network (E-UTRAN) access (Release 10)," 3GPP TS 23.401 V10.0.0, pp. 1-261, 3rd Generation Partnership Project, Valbonne, France (Jun. 2010).

\* cited by examiner

SYSTEM FOR IMPLEMENTING MULTIPLE RADIO ACCESS NETWORKS (RANS) CONVERGENCE AND METHOD THEREOF

CROSS-REFERENCE TO RELATED APPLICATIONS

This application is a continuation of U.S. patent application Ser. No. 16/724,808, filed on Dec. 23, 2019, which is a continuation of U.S. patent application Ser. No. 15/374,847, filed on Dec. 9, 2016 (now U.S. Pat. No. 10,555,206), which is a continuation of U.S. patent application Ser. No. 13/750,233, filed on Jan. 25, 2013 (now U.S. Pat. No. 9,560,547), which is a continuation of International Patent Application No. PCT/CN2011/074791, filed on May 27, 2011, which claims priority to Chinese Patent Application No. 201010246658.2, filed on Jul. 26, 2010. All of the aforementioned patent applications are hereby incorporated by reference in their entireties.

TECHNICAL FIELD

Embodiments of the present disclosure relate to communications technology, and more particularly to a system for implementing a plurality of radio access networks (RANs) convergence, a method thereof, and an access network element.

BACKGROUND

The multi-carrier convergence technology is introduced in all of the universal mobile telecommunications system (UMTS), 3GPP Long Term Evolution (LTE) and code division multiple access (CDMA) 200 network to enhance the peak rate of a user equipment (UE). With the increase in number of carrier convergences, the peak rate of the UE will arrive at another bottleneck.

Accordingly, it is a problem urgently needed to be solved as how to further enhance the peak rate of the UE.

SUMMARY

Various aspects of the present disclosure provide systems for implementing a plurality of RANs convergence, methods thereof, and access network elements, whereby it is made possible for the UE to simultaneously communicate with at least two RANs, thereby improving the peak rate of the UE.

One aspect of the present disclosure provides a method for implementing a convergence system of a plurality of radio access networks, which method comprises an anchor radio access network establishing a connection with a user equipment; the anchor receiving a radio access bearer establishment request transmitted from a core network; the anchor radio access network selecting an auxiliary radio access network; the anchor radio access network sending quality of service parameters to the auxiliary radio access network, so that the auxiliary radio access network establishes a connection with the user equipment according to the quality of service parameters, while the anchor radio access network keeps the connection with the user equipment.

Another aspect of the present disclosure further provides a method for implementing a convergence system of a plurality of radio access networks, which method comprises an auxiliary radio access network receiving quality of service parameters transmitted from an anchor radio access network that has already established a connection with a user equipment; and the auxiliary radio access network establishing a connection with the user equipment according to the quality of service parameters.

Still another aspect of the present disclosure further provides a method for transmitting data for a convergence system of a plurality of radio access networks implemented on the basis of the foregoing methods, which method comprises an anchor radio access network receiving a packet transmitted from a user equipment; and the anchor radio access network merging the received packet transmitted from the user equipment with a packet transmitted from an auxiliary radio access network after the packet having been transmitted by the user equipment to the auxiliary radio access network, and transmitting the merged packet to a core network.

Yet another aspect of the present disclosure further provides a method for transmitting data for a convergence system of a plurality of radio access networks implemented on the basis of the foregoing methods, which method comprises an anchor radio access network receiving a packet transmitted from a core network; and the anchor determining a size of a packet determined to be assigned to an auxiliary radio access network, dividing the received packet, transmitting to the auxiliary radio access network the packet determined to be assigned to the auxiliary radio access network, and transmitting to a user equipment the packet determined to be assigned to itself.

A further aspect of the present disclosure further provides a releasing method for a convergence system of a plurality of radio access networks implemented by using the foregoing methods, which method comprises an anchor radio access network transmitting a release request message to an auxiliary radio access network; the anchor radio access network receiving a release response message transmitted from the auxiliary radio access network; and the anchor radio access network transmitting a bearer release message to a user equipment, instructing the user equipment to release bearer of the auxiliary radio access network.

A still further aspect of the present disclosure further provides a releasing method for a convergence system of a plurality of radio access networks implemented by using the foregoing methods, which method comprises an anchor radio access network transmitting a release request message to an auxiliary radio access network; the anchor radio access network receiving a release response message transmitted from the auxiliary radio access network, the release response message including a radio resource connection release message generated by the auxiliary radio access network; and the anchor radio access network transmitting the radio resource connection release message to a user equipment via direct transfer signaling.

A yet further aspect of the present disclosure further provides a releasing method for a convergence system of a plurality of RANs implemented by using the foregoing methods, which method further comprises an anchor radio access network transmitting a release request message to an auxiliary radio access network; and the auxiliary radio access network transmitting a release response message to the anchor radio access network, and transmitting the release request message to a user equipment.

Another aspect of the present disclosure further provides an anchor radio access network element, which comprises an establishing module configured to establish a connection with a user equipment; a first receiving module configured to receive a radio access bearer establishment request transmitted from a core network; a selecting module configured to select an auxiliary radio access network; and a first processing module configured to transmit quality of service parameters to the auxiliary radio access network, so that the auxiliary radio access network establishes a connection with the user equipment according to the quality of service parameters, and the connection with the user equipment is kept after the auxiliary radio access network has established the connection with the user equipment.

Still another aspect of the present disclosure further provides an auxiliary radio access network element, which comprises a third receiving module configured to receive quality of service parameters transmitted from an anchor radio access network that has already established a connection with a user equipment; and a second processing module configured to establish connection with the user equipment according to the quality of service parameters.

Yet another aspect of the present disclosure further provides a convergence system of a plurality of radio access networks, which system comprises the aforementioned anchor radio access network element and the aforementioned auxiliary radio access network element.

In the embodiments of the present disclosure, first the anchor RAN establishes a connection with the UE, and after receiving a radio access bearer (RAB) establishment request transmitted from a core network (CN), the anchor RAN selects an auxiliary RAN, and transmits quality of service (QoS) parameters to the auxiliary RAN, so that the auxiliary RAN establishes a connection with the UE according to the QoS parameters, and the anchor RAN keeps the connection with the UE after the auxiliary RAN has established the connection with the UE. Thus, multiple RANs convergence is implemented, and the UE establishes connections with the anchor RAN and the auxiliary RAN at the same time, so as to improve the peak rate of the UE.

BRIEF DESCRIPTION OF THE DRAWINGS

To make clearer the explanation of technical solutions of the embodiments of the present disclosure or of the prior art, accompanying drawings needed in the description of the embodiments or the prior art are briefly illustrated below. Apparently, the accompanying drawings illustrated below are merely directed to some embodiments of the present disclosure, and it is possible for persons ordinarily skilled in the art to deduce other drawings from these drawings without creative effort.

DETAILED DESCRIPTION OF THE EMBODIMENTS

To make clearer the objectives, technical solutions, and advantages of the embodiments of the present disclosure, the technical solutions according to the embodiments of the present disclosure will be clearly and completely described below with reference to the accompanying drawings. Apparently, the embodiments as described below are merely partial, rather than entire, embodiments of the present disclosure. On the basis of the embodiments of the present disclosure, all other embodiments obtainable by persons ordinarily skilled in the art without creative effort shall all fall within the protection scope of the present disclosure.

Figure 1:
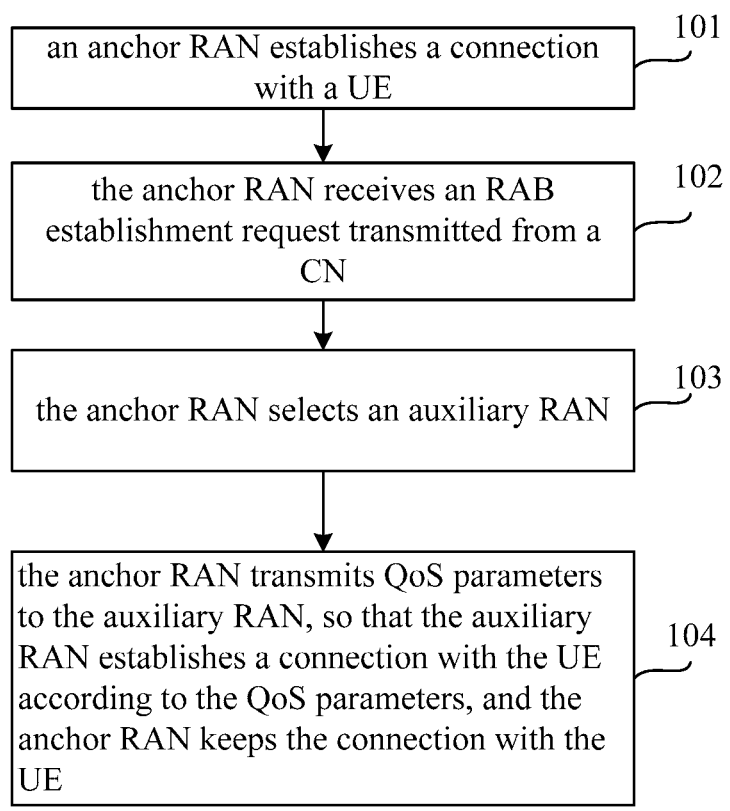
FIG. 1 is a flowchart exemplarily illustrating a method for implementing a convergence system of a plurality of RANs according to one embodiment of the present disclosure.

FIG. 1 is a flowchart exemplarily illustrating a method for implementing a convergence system of a plurality of RANs according to one embodiment of the present disclosure.

101—an anchor RAN establishes a connection with a UE.

102—the anchor RAN receives an RAB establishment request transmitted from a CN.

103—the anchor RAN selects an auxiliary RAN. The auxiliary RAN may employ an accessing technique different from that employed by the anchor RAN or identical with that employed by the anchor RAN.

104—the anchor RAN transmits quality of service (QoS) parameters to the auxiliary RAN, so that the auxiliary RAN establishes a connection with the UE according to the QoS parameters, and the anchor RAN keeps the connection with the UE, i.e. the anchor RAN does not release the connection with the UE after the auxiliary RAN has established the connection with the UE.

Through 101 to 104, the anchor RAN and at least one auxiliary RAN simultaneously establish connections with the UE, namely is realized the convergence of at least two RANs.

Figure 2:
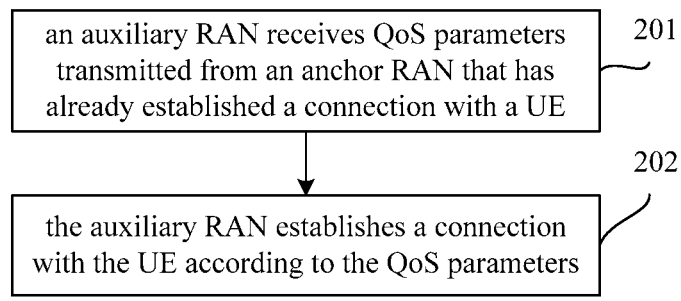
FIG. 2 is a flowchart exemplarily illustrating a method for implementing a convergence system of a plurality of RANs according to another embodiment of the present disclosure.

FIG. 2 is a flowchart exemplarily illustrating a method for implementing a convergence system of a plurality of RANs according to another embodiment of the present disclosure.

201—an auxiliary RAN receives QoS parameters transmitted from an anchor RAN that has already established a connection with a UE. The auxiliary RAN may employ an accessing technique different from that employed by the anchor RAN or identical with that employed by the anchor RAN.

202—the auxiliary RAN establishes a connection with the UE according to the QoS parameters.

Figure 3:
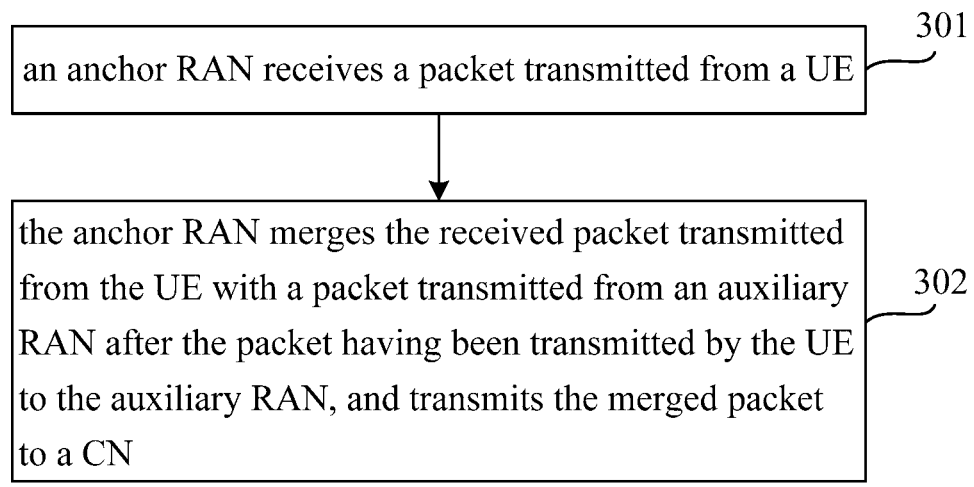
FIG. 3 is a flowchart exemplarily illustrating a method for transmitting data based on a convergence system of a plurality of RANs according to another embodiment of the present disclosure.

FIG. 3 is a flowchart exemplarily illustrating a method for transmitting data based on a convergence system of a plurality of RANs according to another embodiment of the present disclosure.

301—an anchor RAN receives a packet transmitted from a UE.

302—the anchor RAN merges the received packet transmitted from the UE with a packet transmitted from an auxiliary RAN after the packet having been transmitted by the UE to the auxiliary RAN, and transmits the merged packet to a CN.

Figure 4:
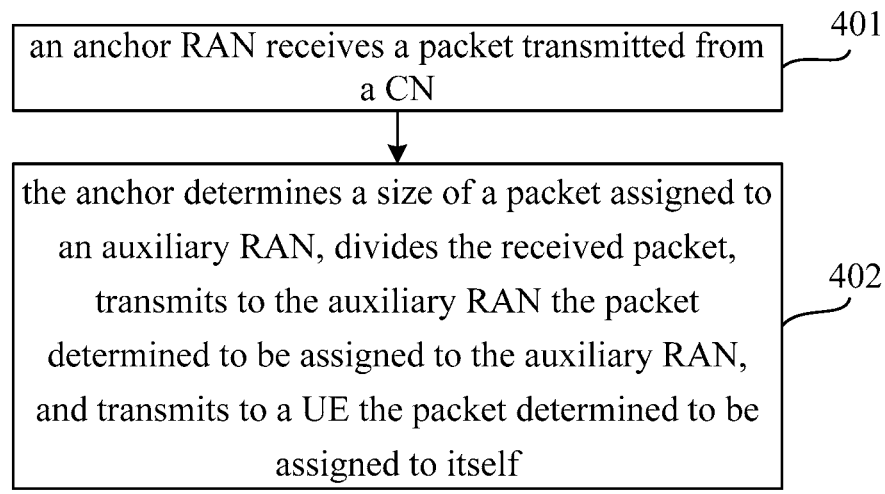
FIG. 4 is a flowchart exemplarily illustrating a method for transmitting data based on a convergence system of a plurality of RANs according to another embodiment of the present disclosure.

FIG. 4 is a flowchart exemplarily illustrating a method for transmitting data based on a convergence system of a plurality of RANs according to another embodiment of the present disclosure.

401—an anchor RAN receives a packet transmitted from a CN.

402—the anchor determines a size of a packet assigned to an auxiliary RAN, divides the received packet, transmits to the auxiliary RAN the packet determined to be assigned to the auxiliary RAN, and transmits to a UE the packet determined to be assigned to itself.

Figure 5:
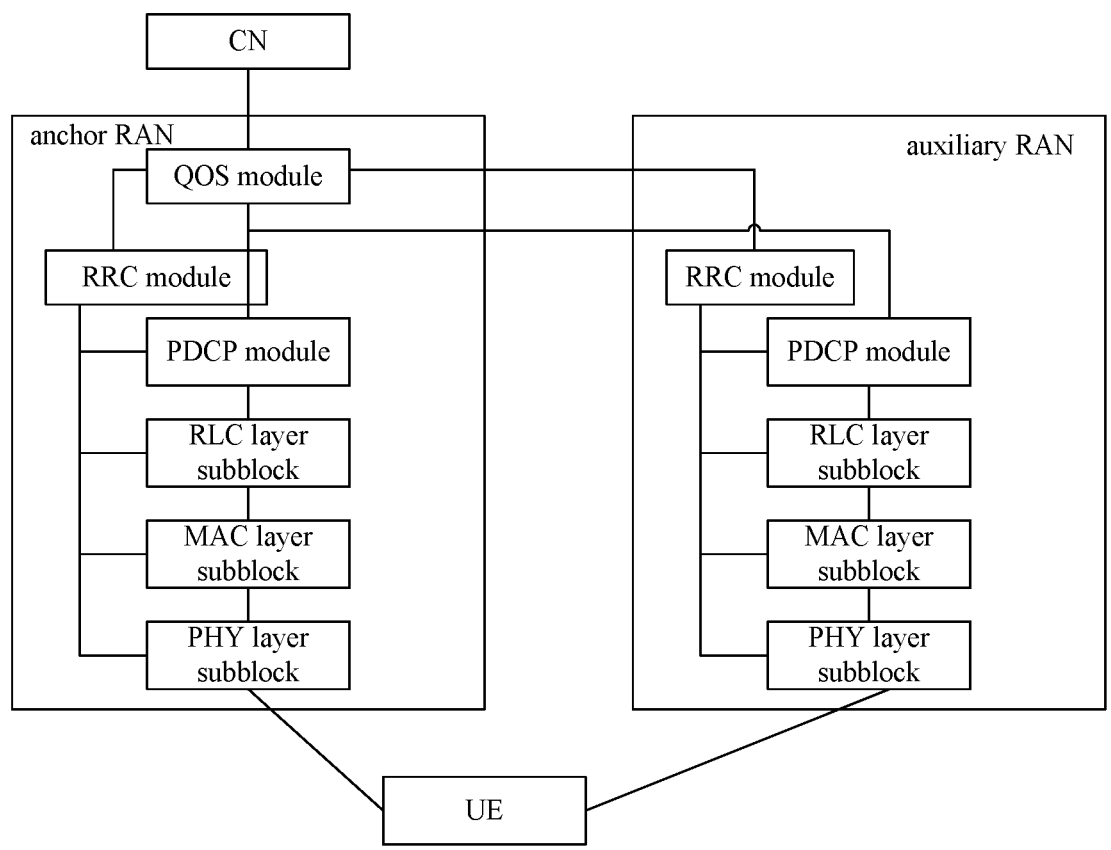
FIG. 5 is a schematic diagram exemplarily illustrating the principles of a method for implementing convergence of a plurality of RANs and a method for transmitting data according to another embodiment of the present disclosure.

FIG. 5 is a schematic diagram exemplarily illustrating the principles of a method for implementing convergence of a plurality of RANs and a method for transmitting data according to another embodiment of the present disclosure. In the various embodiments of the present disclosure, the UE communicates with at least two RANs, one of which is an anchor RAN, and the remaining one in the at least two RANs besides the anchor RAN is an auxiliary RAN (also referred to as "secondary RAN"). The anchor RAN communicates with a core network (CN). The auxiliary RAN can either directly communicate with the UE or communicate with the UE via the anchor RAN.

In the embodiments of the present disclosure, the RANs participating in the convergence may include a radio resource control (RRC) module and a user interface processing module.

The RRC module is responsible configured to map QoS parameters needed by the service into radio resource allocation, and manage the radio resource between the UE and the RANs.

The user interface processing module may include one or more of the following modules: namely a packet data convergence protocol (PDCP) module, a radio link control (RLC) layer subblock, a media access control (MAC) layer subblock and a physical (PHY) layer subblock, etc., which are responsible for data processing at the user interface, for compressing, segmenting and recombining IP packets, and for selecting physical channels to transmit packets.

The anchor RAN receives QoS parameters of a service from the CN, divides the QoS parameters, and transmits the divided QoS parameters to the auxiliary RAN, whereupon the auxiliary RAN can establish a connection with the UE according to these QoS parameters.

After the auxiliary RAN has established the connection with the UE, the anchor RAN distributes downlink packets received from the CN to itself and other auxiliary RANs, merges uplink packets received by itself and other auxiliary RANS and then transmits the merged packets to the CN.

Figure 6:
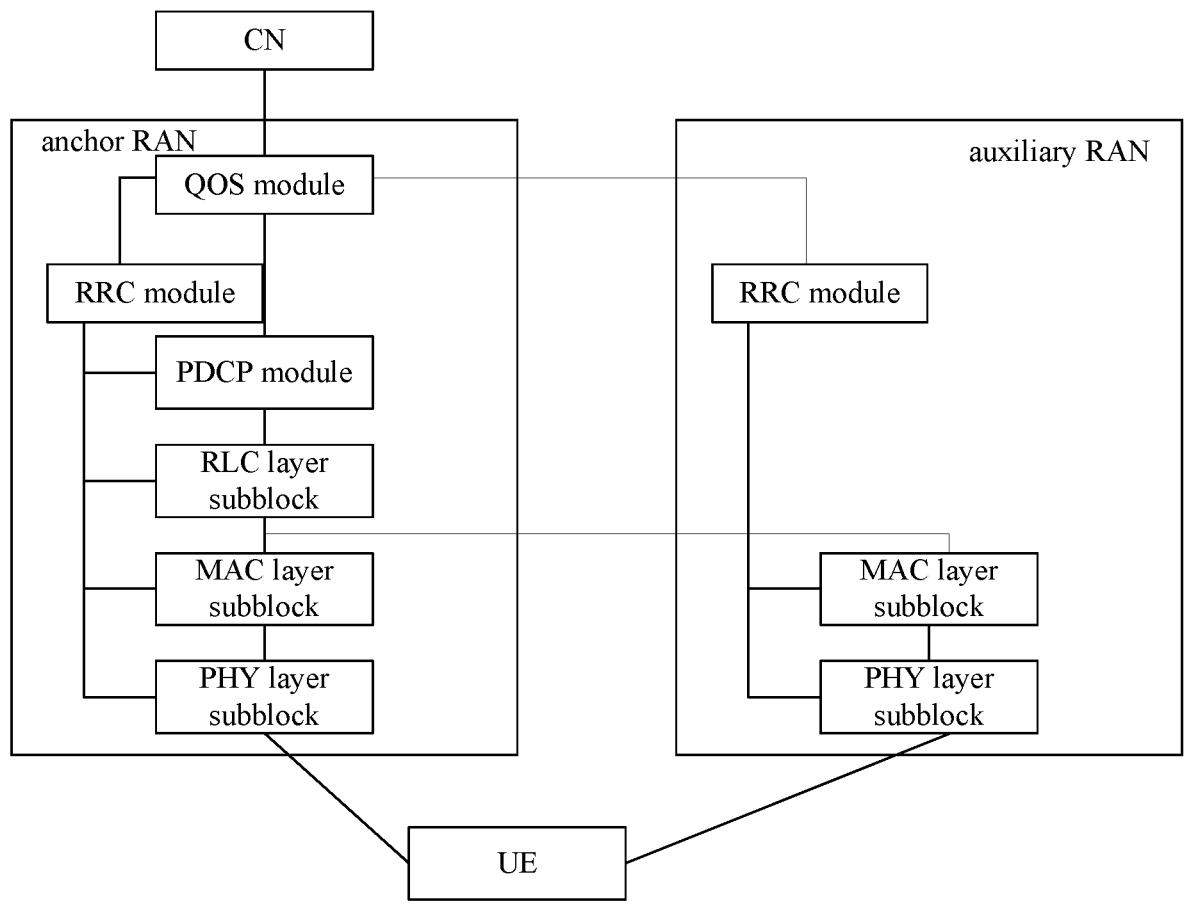
FIG. 6 is another schematic diagram exemplarily illustrating the principles of a method for implementing a convergence system of a plurality of RANs and a method for transmitting data according to another embodiment of the present disclosure.

FIG. 6 is another schematic diagram exemplarily illustrating the principles of a method for implementing a convergence system of a plurality of RANs and a method for transmitting data according to another embodiment of the present disclosure. In this embodiment, the anchor RAN includes a QoS module, an RRC module, a PDCP module, an RLC layer subblock, an MAC layer subblock and a PHY layer subblock, and the auxiliary RAN includes an RRC module, an MAC layer subblock and a PHY layer subblock. The auxiliary RAN cannot perform RLC processing and PDCP processing, because the auxiliary RAN does not include any RLC layer subblock and PDCP module, and data in the auxiliary RAN has to be performed with RLC processing and PDCP processing by the anchor RAN. This is equivalent to say that the RLC layer subblock and the PDCP module in the anchor RAN are commonly used by the anchor RAN and the auxiliary RAN.

In another embodiment of the present disclosure, it is also possible for the auxiliary RAN to include an MAC layer subblock, a PHY layer subblock and an RLC layer subblock, and to use a PDCP module commonly with the anchor RAN.

Figure 7:
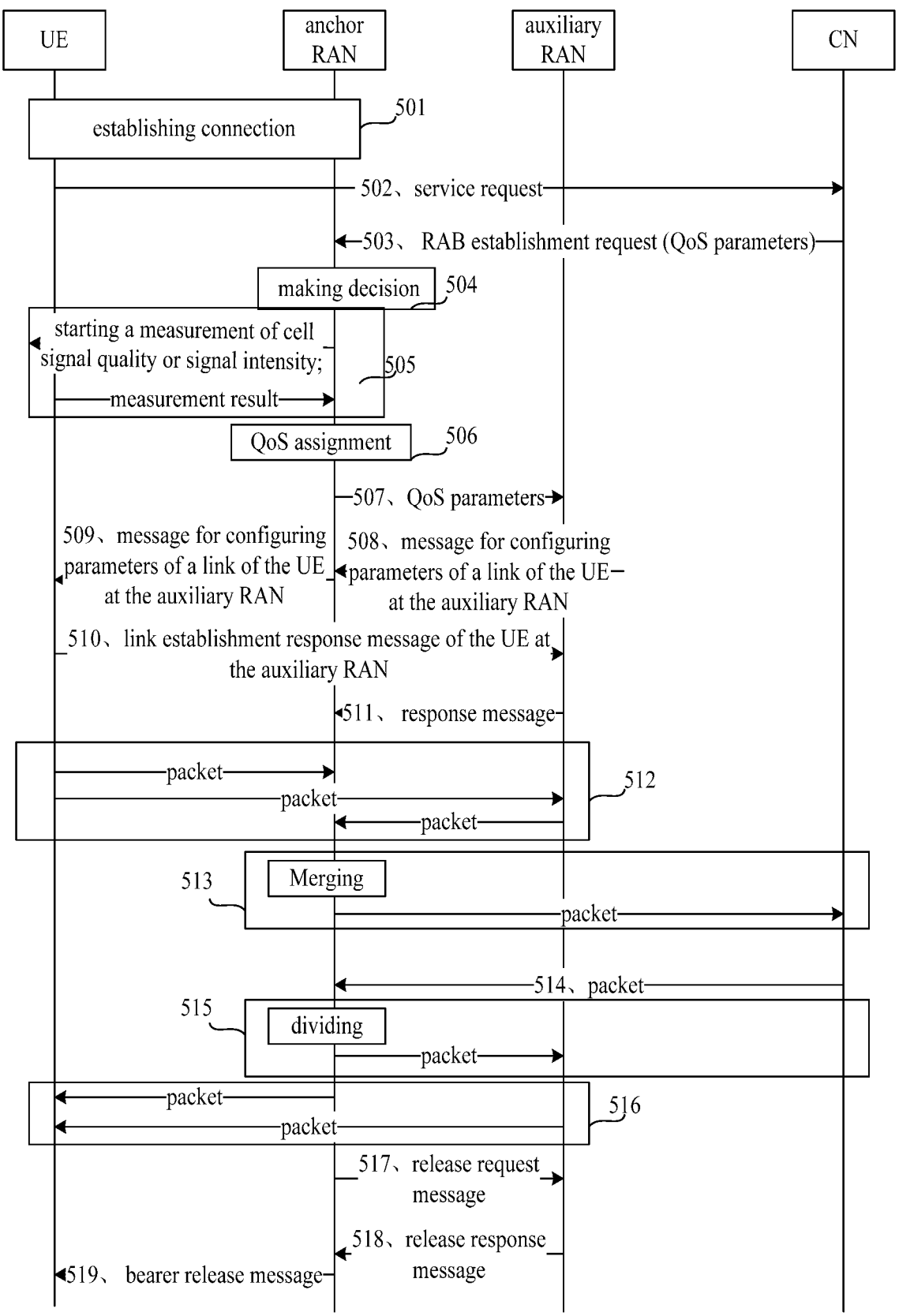
FIG. 7 is a diagram illustrating signaling interaction amongst a method for implementing a convergence system of a plurality of RANs, a method for transmitting data, and a connection releasing method according to another embodiment of the present disclosure.

FIG. 7 is a diagram illustrating signaling interaction amongst a method for implementing a convergence system of a plurality of RANs, a method for transmitting data, and a connection releasing method according to another embodiment of the present disclosure. Taken for examples in FIG. 7 are a terrestrial radio access network of the UMTS (UTRAN) as an anchor RAN and a UTRAN in the LTE (EUTRAN) as an auxiliary RAN to make explanations. The method for implementing a convergence system of RANs with differing mode is recited as follows.

501—a UE establishes a connection with an anchor RAN.

For instance, the UE establishes an RRC connection with the anchor RAN. In the process of establishing the connection with the anchor RAN, the UE may report to the anchor RAN a measurement result of candidate RANs and radio access capability information of the UE in the candidate RANs. The measurement result of the candidate RANs as reported by the UE may include cell signal quality or signal intensity of the candidate RANs reported by the UE. The radio access capability information of the UE in the candidate RANs includes such radio capability information as radio frequency capability information, physical layer capability information and measurement capability information of the UE while the systems of the candidate RANs are operating. The measurement result of the candidate RANs can be carried in an RRC connection establishment request. The radio access capability information of the UE in the candidate RANs can be carried in an RRC connection establishment completion message.

502—the UE makes use of an RRC initial connection established with the anchor RAN to transmit a service request to a CN.

503—the CN transmits a radio access bearer (RAB) establishment request to the anchor RAN, and transmits to the anchor RAN at least one of a QoS parameter, an encrypted parameter and an already assigned RLC layer parameter, of which the QoS parameter can be carried in the RAB establishment request.

504—the anchor RAN makes a decision: if the service should be established on a single RAN, the followings can be dispensed with; if the service should be established on at least two RANs, the process goes to the followings.

505—the anchor RAN selects an auxiliary RAN.

If in 501 the measurement result of the candidate RANs and the radio access capability information of the UE in the candidate RANs are reported to the anchor RAN during the process in which the UE establishes the connection with the anchor RAN, then in 505 the anchor RAN may select the auxiliary RAN from the candidate RANs according to the measurement result of the candidate RANs. For instance, if the cell signal quality or signal intensity of a certain candidate RAN in the measurement result of the candidate RANs reported by the UE is greater than a preset threshold value, it is possible to select this candidate RAN as the auxiliary RAN.

If in 501 the measurement result of the candidate RANs is not reported to the anchor RAN during the process in which the UE establishes the initial connection with the anchor RAN, then in 505 the anchor RAN may start a measurement of cell signal quality or signal intensity of cells of the candidate RANs (for instance, the anchor RAN may start a measurement of cells in a possibly cooperative LTE network), and obtain a measurement result. The anchor RAN may base on such factors as the measurement result and the load to determine which RAN should be selected as the auxiliary RAN. For instance, the anchor RAN may select a candidate RAN whose cell signal quality or signal intensity is greater than a preset threshold value as the auxiliary RAN, or may select a candidate RAN whose load is low as the auxiliary RAN.

In the embodiment as shown in FIG. 7, the anchor RAN selects the EUTRAN in the LTE as the auxiliary RAN.

506—the anchor RAN assigns the QoS parameters received in 503, determines the QoS parameter assigned to itself and the QoS parameter assigned to the auxiliary RAN and transmits the QoS parameter to the auxiliary RAN; alternatively, the anchor RAN may convert the QoS parameter determined to be assigned to the auxiliary RAN into a QoS parameter matching with the auxiliary RAN.

Taking for example one of the QoS parameters, namely aggregate maximum bit rate (AMBR), the anchor RAN may assign the same AMBR value to itself and to the auxiliary RAN, and the value is equivalent to the AMBR value demanded by the service (namely the AMBR value received by the anchor RAN from the core network), while it is also possible to divide the AMBR demanded by the service equally for the anchor RAN and the auxiliary RAN.

507—the anchor RAN transmits to the auxiliary RAN at least one information from such information as the QoS parameter assigned to the auxiliary RAN, the encrypted information, the radio access capability information of the UE at the auxiliary RAN, the cell information of the service, and the already assigned RLC layer parameter information. If the auxiliary RAN includes an RLC layer subblock, the anchor RAN may not transmit the RLC layer parameter information to the auxiliary RAN.

508—the auxiliary RAN transmits to the anchor RAN a message for configuring parameters of a link of the UE at the auxiliary RAN through an interface with the anchor RAN.

The message for configuring parameters of a link of the UE at the auxiliary RAN includes at least one of a physical layer parameter, an MAC parameter, an RLC layer parameter, and a PDCP layer parameter of the UE in the auxiliary RAN, and further includes signaling channel setting information. The physical layer parameter, the MAC parameter, the RLC layer parameter, and the PDCP layer parameter of the UE in the auxiliary RAN can be obtained by the auxiliary RAN according to the received QoS parameters.

509—the anchor RAN transmits to the UE the message for configuring parameters of a link of the UE at the auxiliary RAN.

Since the message for configuring parameters of a link of the UE at the auxiliary RAN includes the signaling channel setting information, after the UE has received the message for configuring parameters of a link of the UE at the auxiliary RAN, it is possible to establish a direct transfer signaling channel with the auxiliary RAN.

510—the UE transmits to the auxiliary RAN a link establishment response message of the UE at the auxiliary RAN.

Since the UE can already establish a direct transfer signaling channel with the auxiliary RAN according to the signaling channel information after 509, if the signaling channel is well established, then it is possible in 510 for the UE to directly transmit to the auxiliary RAN the link establishment response message of the UE at the auxiliary RAN, without the message having to be forwarded by the anchor RAN.

511—the auxiliary RAN transmits to the anchor RAN a response message that may include initial flow control information assigned by the auxiliary RAN. The initial flow control information may include a size of a cache assigned by the auxiliary RAN.

After 511, connections of the UE with the anchor RAN and the auxiliary RAN have already been well established, and the anchor RAN also always keeps the connection with the UE. If there is a service to be proceeded, the UE can simultaneously communicate with the two access networks of differing mode.

In this embodiment, after the connection between the auxiliary RAN and the UE has been established, the anchor RAN still keeps the connection with the UE and does not release the connection with the UE, and it is thus possible for the UE to communicate with the core network through the two access networks of differing mode. The two connections will be released until the connection between the anchor RAN and the UE and the connection between the auxiliary RAN and the UE are requested to be released.

Moreover, in this embodiment, once the anchor RAN communicates with a core network, the auxiliary RAN will not communicate with another core network, and instead communicates through the anchor RAN with the core network that is connected to the anchor RAN. The auxiliary RAN thus functions to help transmit the packet of the UE to the core network, and help transmit the packet of the core network to the UE, while there is no connection with the UE between the auxiliary RAN and the core network.

The method for transmitting data for a convergence system of RANs with differing mode based on the aforementioned establishments may comprise the following 512-513.

512—the UE transmits packets to the anchor RAN and the auxiliary RAN, and the auxiliary RAN transmits the packets to the anchor RAN.

513—the anchor RAN merges the packet of the auxiliary RAN with the packet of itself and transmits the merged packet to the CN.

It is explained in 512 and 513 how the UE simultaneously transmits packets to the CN via two RANs of differing mode.

If it is needed for the CN to transmit packets to the UE, the following 514 to 515 may be employed.

514—the CN transmits a packet to the anchor RAN.

515—the anchor RAN divides the packet transmitted from the CN according to the previously received initial flow control information, determines a size of the packet assigned to the auxiliary RAN, and transmits to the auxiliary RAN the packet determined to be transmitted by the auxiliary RAN. Specifically, the anchor RAN may determine the cache state of the auxiliary RAN according to the initial flow control information carried in the response message of the auxiliary RAN, compare the cache state of the auxiliary RAN with the cache state of itself, and determine sizes of the packets to be transmitted on the two RANs according to the cache comparison value.

516—the anchor RAN and the auxiliary RAN respectively transmit the packets to the UE.

The releasing method for a system of RANs with differing mode may employ the following 517 to 519.

517—the anchor RAN transmits a release request message to the auxiliary RAN.

518—the auxiliary RAN transmits a release response message to the anchor RAN.

519—the anchor RAN transmits to the UE a bearer release message instructing it is needed to release bearer of the auxiliary RAN.

As should be noted, in order to achieve convergence of RANs with differing mode in the embodiment illustrated by FIG. 7, it is not necessary to execute the steps sequentially to their completion, as these steps are adjustable, and can be selectively executed. For instance, if it is merely needed for the UE to transmit packets to the CN, 514 to 516 can be dispensed with. If it is not needed to release the auxiliary RAN, 517 to 519 can be dispensed with.

The aforementioned embodiment of the present disclosure provides a method for convergence of RANs with differing mode, whereby the anchor RAN firstly establishes a connection with the UE, and after receiving a RAB establishment request transmitted from the CN, the anchor RAN selects an auxiliary RAN and transmits QoS parameters to the auxiliary RAN, so that the auxiliary RAN establishes a connection with the UE according to the QoS parameters. Thus, convergence of RANs with differing mode is implemented, and the UE establishes connections with the anchor RAN and the auxiliary RAN at the same time, so as to improve the peak rate of the UE.

Figure 8:
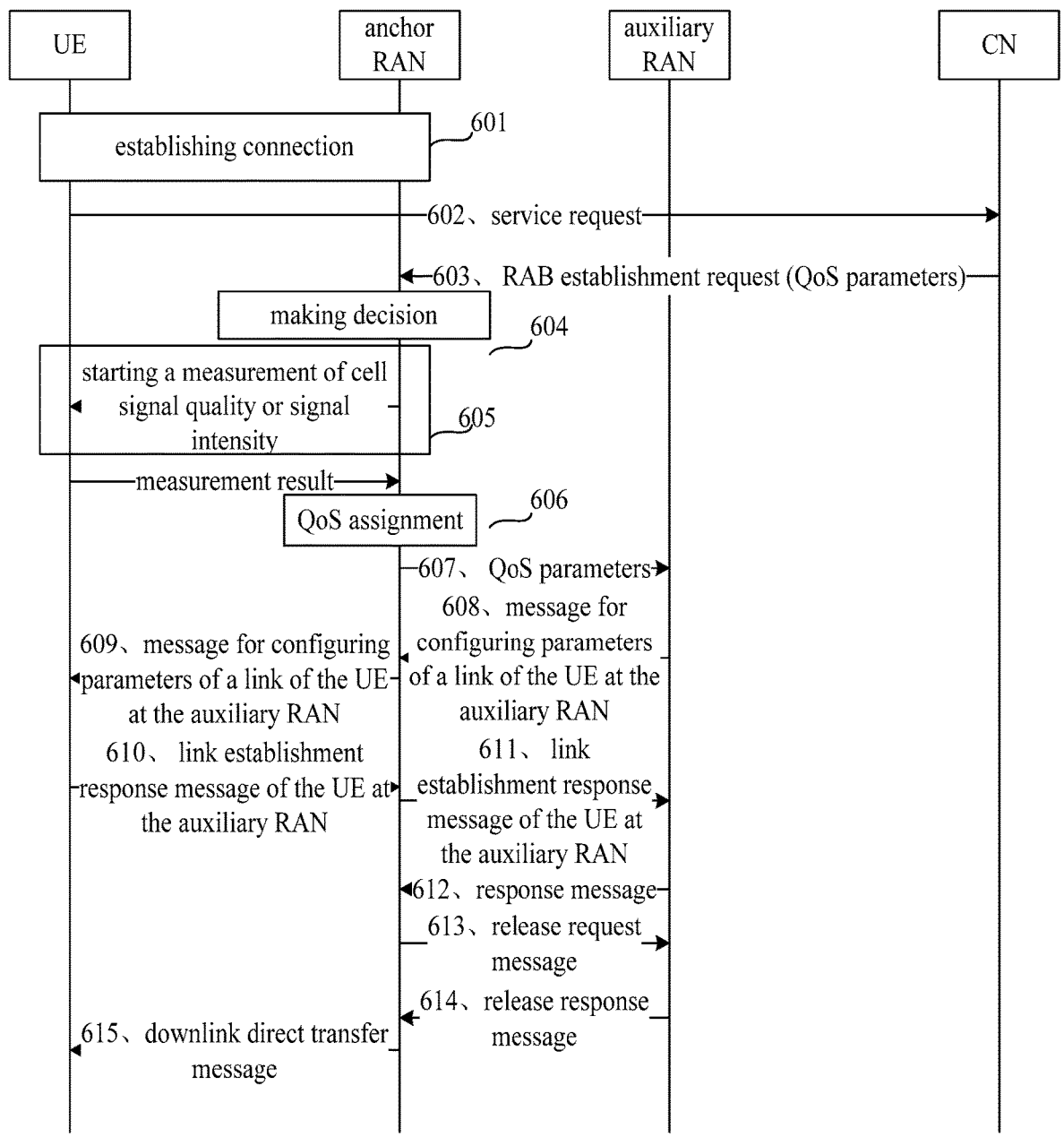
FIG. 8 is another diagram illustrating signaling interaction amongst a method for implementing a convergence system of a plurality of RANs, a method for transmitting data, and a connection releasing method according to another embodiment of the present disclosure.

FIG. 8 is another diagram illustrating signaling interaction amongst a method for implementing a convergence system of a plurality of RANs, a method for transmitting data, and a connection releasing method according to another embodiment of the present disclosure. In FIG. 8, the anchor RAN is a radio network controller (RNC), and the auxiliary RAN is a base station in the LTE (eNB). In this embodiment, the method for implementing a convergence system of RANs with differing mode includes 601-607 that are respectively identical with 501-507.

This embodiment differs from the method for implementing a convergence system of RANs with differing mode as illustrated by FIG. 7 in the fact that the method for establishing a connection between the auxiliary RAN and the UE is different from that of the embodiment illustrated by FIG. 7.

In the embodiment as shown in FIG. 8, the method for establishing a connection between the auxiliary RAN and the UE may be as described below.

608—the auxiliary RAN transmits to the anchor RAN a message for configuring parameters of a link of the UE at the auxiliary RAN via an interface with the anchor RAN. The message for configuring parameters of a link of the UE at the auxiliary RAN includes at least one of a physical layer parameter, an MAC parameter, an RLC layer parameter, and a PDCP layer parameter of the UE in the auxiliary RAN. The message for configuring parameters of a link of the UE at the auxiliary RAN can be a downlink direct transfer message.

609—the anchor RAN transmits to the UE the message for configuring parameters of a link of the UE at the auxiliary RAN.

610—the UE transmits to the anchor RAN a link establishment response message of the UE at the auxiliary RAN. Since the parameters of a link of the UE at the auxiliary RAN do not include signaling channel setting information in this embodiment, it is impossible for the UE to establish a direct transfer signaling channel with the auxiliary RAN, so the UE transmits the link establishment response message at the auxiliary RAN to the anchor RAN, and the anchor RAN forwards this message to the auxiliary RAN. The link establishment response message of the UE at the auxiliary RAN can be an uplink direct transfer message.

611—the anchor RAN transmits to the auxiliary RAN the link establishment response message of the UE at the auxiliary RAN.

612—the auxiliary RAN transmits to the anchor RAN a response message that may include initial flow control information assigned by the auxiliary RAN.

The method for releasing connection in the embodiment illustrated by FIG. 8 is also different from that illustrated by FIG. 7, specifically as follows.

613—the anchor RAN transmits a release request message to the auxiliary RAN.

614—the auxiliary RAN transmits to the anchor RAN a release response message that includes a radio resource connection release message generated by the auxiliary RAN.

615—the anchor RAN transmits to the UE the radio resource connection release message via a downlink direct transfer message (also referred to as UU signaling direct transfer).

The releasing method for a convergence system of RANs with differing mode in this embodiment can also be applied to the system established according to the method illustrated by FIG. 7.

Figure 9:
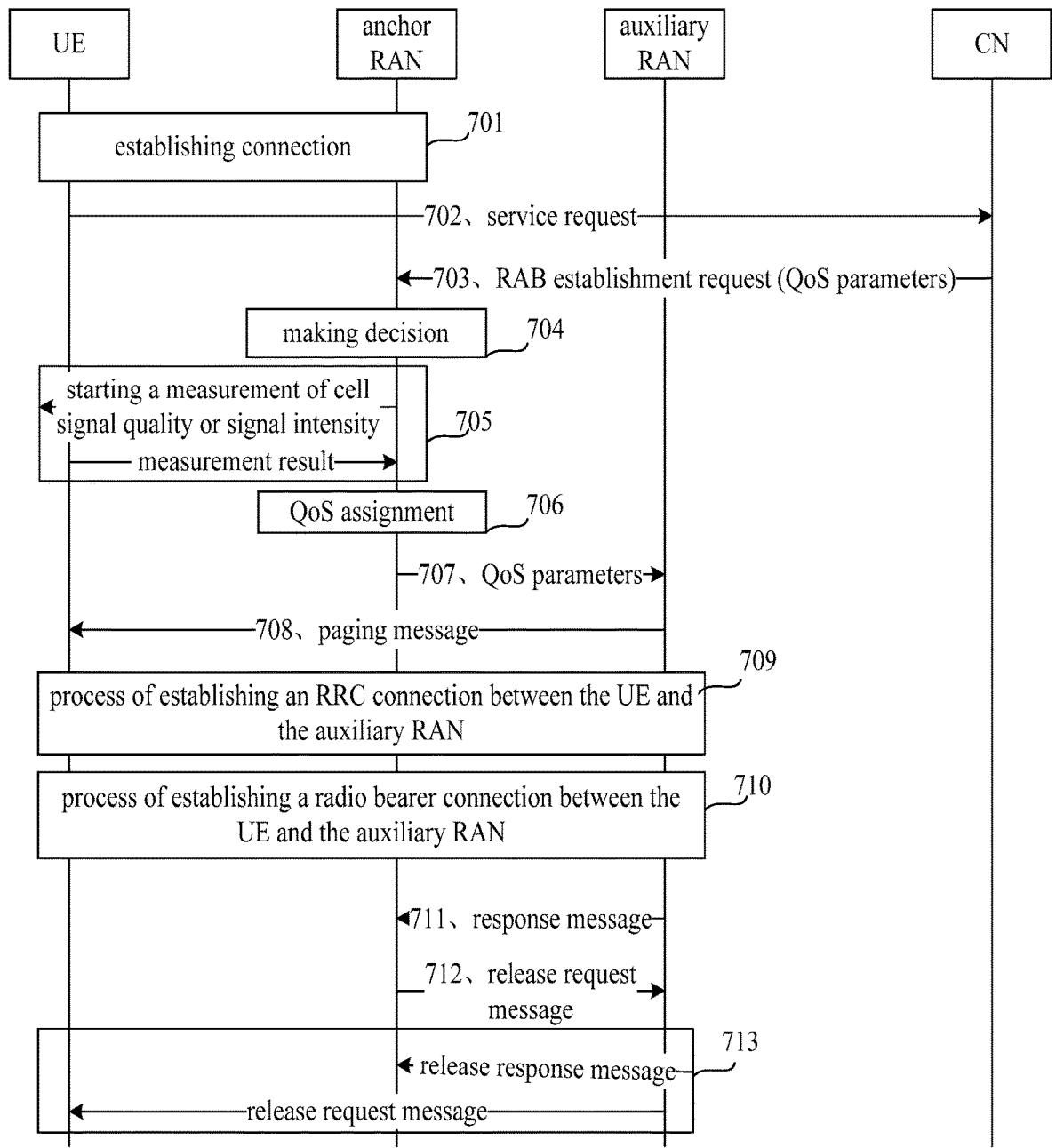
FIG. 9 is still another diagram illustrating signaling interaction amongst a method for implementing a convergence system of a plurality of RANs, a method for transmitting data, and a connection releasing method according to another embodiment of the present disclosure.

FIG. 9 is still another diagram illustrating signaling interaction amongst a method for implementing a convergence system of a plurality of RANs, a method for transmitting data, and a connection releasing method according to another embodiment of the present disclosure. In FIG. 9, the anchor RAN is an RNC, and the auxiliary RAN is an eNB in the LTE.

701-707 are respectively identical with 501-507.

The embodiment illustrated by FIG. 9 differs from the method illustrated by FIG. 7 in the fact that the method for establishing a connection between the auxiliary RAN and the UE in the embodiment illustrated by FIG. 9 is different from that of the embodiment illustrated by FIG. 7.

The method for establishing a connection between the auxiliary RAN and the UE in the embodiment illustrated by FIG. 9 may be as described below.

708—the auxiliary RAN transmits a paging message to the UE; the paging message can be directly transmitted to the UE or forwarded via the anchor RAN.

709—the UE responds to the paging message, and establishes an RRC connection with the auxiliary RAN according to QoS parameters.

710—the auxiliary RAN uses the RRC connection to establish a radio bearer connection of the auxiliary RAN with the UE.

711—the auxiliary RAN transmits to the anchor RAN a response message that includes initial flow control information assigned by the auxiliary RAN.

The method for establishing a connection between the auxiliary RAN and the UE in the embodiment illustrated by FIG. 9 is actually via the paging message to trigger the auxiliary RAN to establish a connection with the UE.

The method for releasing connection for the convergence system of RANs with differing mode established on the basis of FIG. 9 may be as described below.

712—the anchor RAN transmits a release request to the auxiliary RAN.

713—the auxiliary RAN transmits a release response to the anchor RAN, and transmits a release request message to the UE.

The releasing method for a convergence system of RANs with differing mode as illustrated by FIG. 9 can also be applied to the convergence systems of RANs with differing mode established in the embodiments illustrated by FIG. 7 and FIG. 8.

Figure 10:
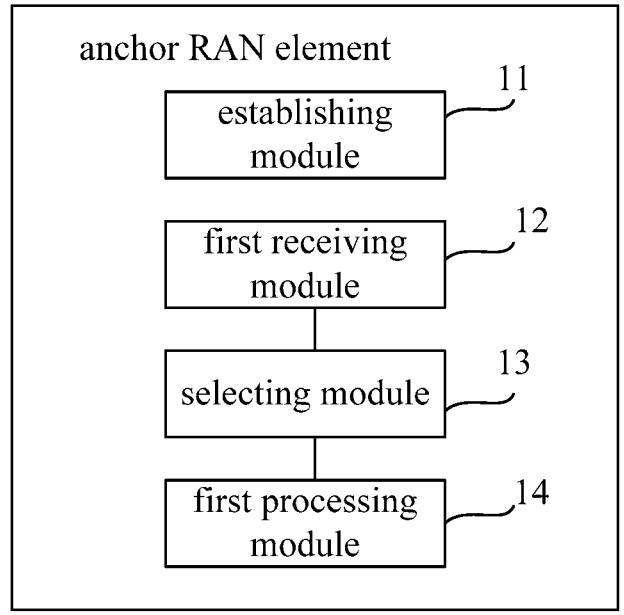
FIG. 10 is a schematic diagram exemplarily illustrating the structure of an anchor access network element according to another embodiment of the present disclosure.

FIG. 10 is a schematic diagram exemplarily illustrating the structure of an anchor access network element according to another embodiment of the present disclosure. The network element comprises an establishing module 11, a first receiving module 12, a selecting module 13 and a first processing module 14. The establishing module 11 is configured to establish a connection with the UE. The first receiving module 12 is configured to receive a RAB establishment request transmitted from the CN. The selecting module 13, connected to the first receiving module 12, is configured to selecting an auxiliary RAN after the first receiving module 12 has received the RAB establishment request transmitted from the CN. The first processing module 14, connected to the selecting module 13, configured to transmit QoS parameters to the auxiliary RAN, so that the auxiliary RAN establishes a connection with the UE according to the QoS parameters, and the connection with the UE is kept after the connection between the auxiliary RAN and the UE has been established.

In this embodiment, the selecting module 13 can be specifically configured to trigger a measurement of cells of candidate RANs, obtain a measurement result, and select an auxiliary RAN from the candidate RANs according to the measurement result. For instance, the anchor RAN may select a candidate RAN whose cell signal quality or signal intensity is greater than a preset threshold value as the auxiliary RAN.

Figure 11:
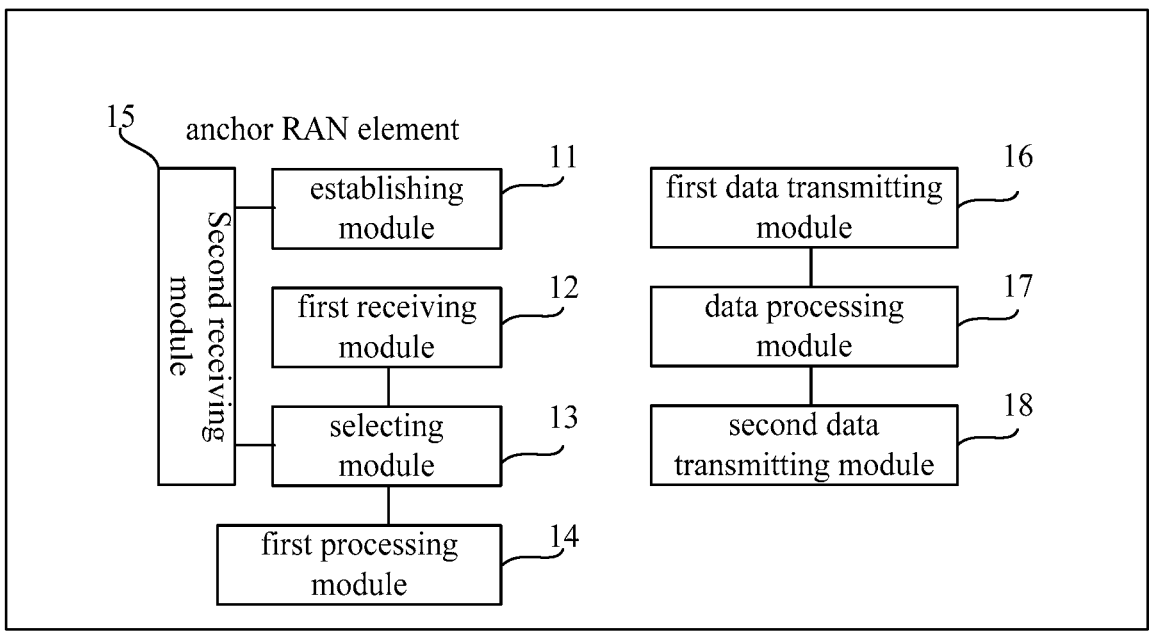
FIG. 11 is a schematic diagram exemplarily illustrating the structure of an anchor access network element according to another embodiment of the present disclosure.

FIG. 11 is a schematic diagram exemplarily illustrating the structure of an anchor access network element according to another embodiment of the present disclosure. On the basis of the network element shown in FIG. 10, the network element shown in FIG. 11 further includes a second receiving module 15 that is connected to the establishing module 11 and the selecting module 13 is configured to receive a measurement result of candidate RANs and/or radio access capability information of the candidate RANs as reported by the UE during the process in which the establishing module 11 establishes a connection with the UE. The selecting module 13 may select the auxiliary RAN according to the measurement result received by the second receiving module.

In the embodiment shown in FIG. 10 or 11, the first processing module 14 can be specifically configured to assigne QoS parameters, determining the QoS parameter assigned to the auxiliary RAN, and transmitting to the auxiliary RAN the QoS parameter determined to be assigned to the auxiliary RAN.

The embodiment as shown in FIG. 11 may further include a first data transmitting module 16, a data processing module 17 and a second data transmitting module 18. The first data transmitting module 16 is configured to receive a packet transmitted from the UE and a packet transmitted from the auxiliary RAN after the packet having been transmitted by the UE to the auxiliary RAN. The data processing module 17 is connected to the first data transmitting module 16 and is configured to merge the packet transmitted from the UE and the packet transmitted from the auxiliary RAN after the packet having been transmitted by the UE to the auxiliary RAN as received by the first data transmitting module 16. The second data transmitting module 18 is connected to the data processing module 17 and is configured to transmit the packet merged by the data processing module 17 to the CN.

The second data transmitting module 18 can also be configured to receive a packet transmitted from the CN. The data processing module 17 can also be configured to determine a size of a packet assigned to the auxiliary RAN, divide the received packet, and transmit to the first data transmitting module 16 the packet determined to be assigned to the auxiliary RAN. The first data transmitting module 16 can also be configured to transmit to the auxiliary RAN the packet determined by the data processing module 17 to be assigned to the auxiliary RAN, and transmit to the UE the packet determined to be assigned to itself.

See the foregoing descriptions of the method embodiments for the working principles of the various modules in the embodiments shown in FIG. 10 and FIG. 11.

Figure 12:
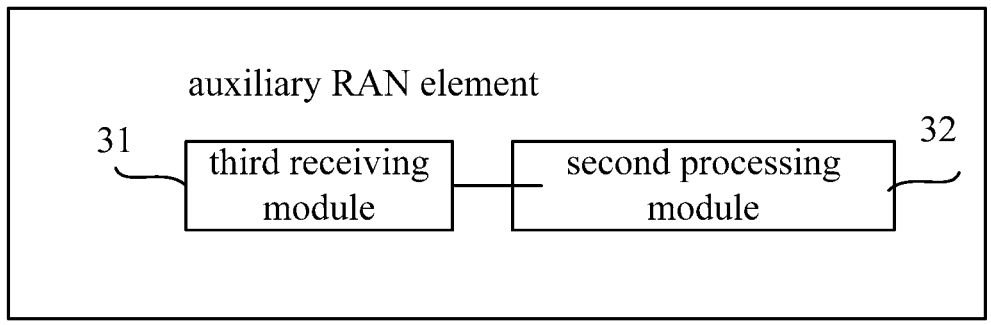
FIG. 12 is a schematic diagram exemplarily illustrating the structure of an auxiliary RAN element according to another embodiment of the present disclosure.

FIG. 12 is a schematic diagram exemplarily illustrating the structure of an auxiliary RAN element according to another embodiment of the present disclosure. The network element includes a third receiving module 31 and a second processing module 32. The third receiving module 31 is configured to receive QoS parameters transmitted from an anchor RAN that has already established a connection with a UE. The second processing module 32 is connected to the third receiving module 31 and is configured to establish a connection with the UE according to the QoS parameters.

Figure 13:
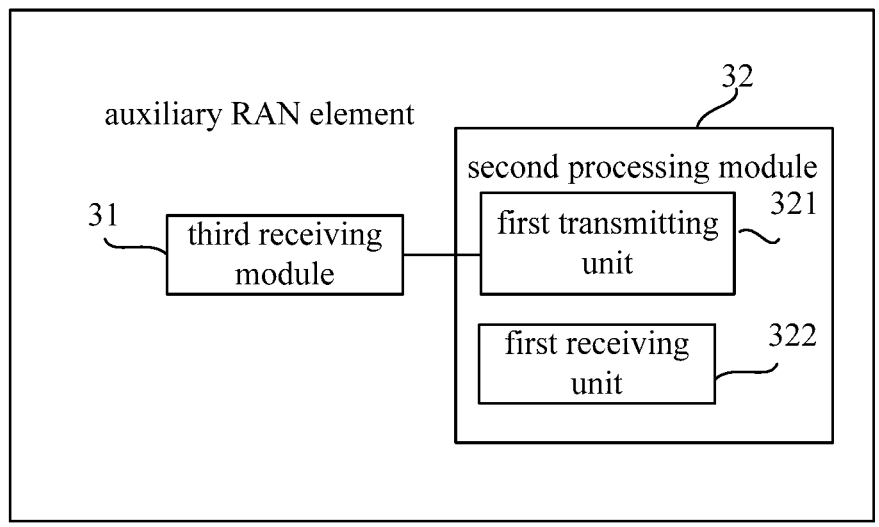
FIG. 13 is a schematic diagram exemplarily illustrating the structure of an auxiliary RAN element according to another embodiment of the present disclosure.

FIG. 13 is a schematic diagram exemplarily illustrating the structure of an auxiliary RAN element according to another embodiment of the present disclosure. In this embodiment, the second processing module 32 includes a first transmitting unit 321 and a first receiving unit 322. The first transmitting unit 321 is configured to transmit to the anchor RAN a message for configuring parameters of a link of the UE at the auxiliary RAN, so that the anchor RAN transmits to the UE the message for configuring parameters of a link of the UE at the auxiliary RAN. The message for configuring parameters of a link of the UE at the auxiliary RAN includes at least one of a physical layer parameter, an MAC parameter, an RLC layer parameter, and a PDCP layer parameter of the UE in the auxiliary RAN. The first receiving unit 322 is configured to receive a link establishment response message of the UE at the auxiliary RAN as transmitted by the anchor RAN, and the link establishment response message of the UE at the auxiliary RAN as transmitted by the anchor RAN is transmitted by the UE to the anchor RAN.

Figure 14:
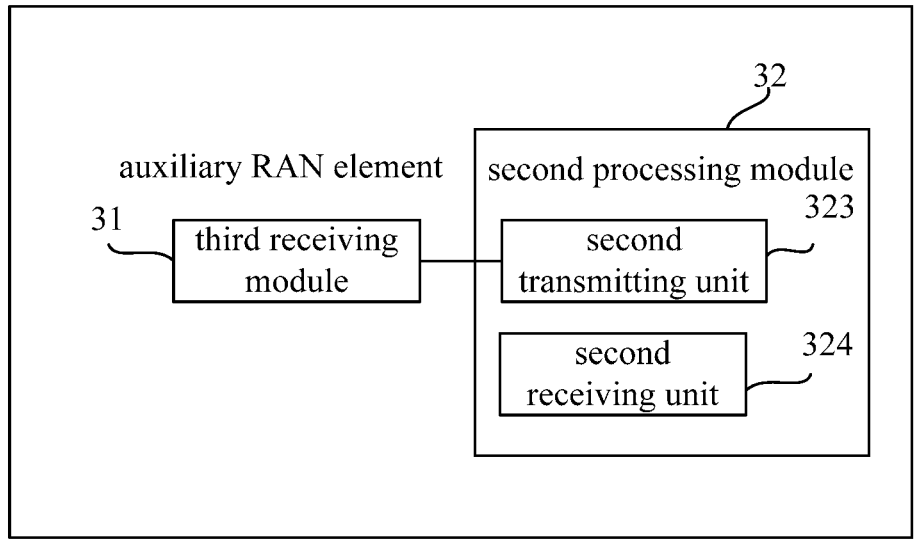
FIG. 14 is a schematic diagram exemplarily illustrating the structure of an auxiliary RAN element according to another embodiment of the present disclosure.

FIG. 14 is a schematic diagram exemplarily illustrating the structure of an auxiliary RAN element according to another embodiment of the present disclosure. In FIG. 14, the third processing module includes a second transmitting unit 323 and a second receiving unit 324. The second transmitting unit 323 is configured to transmit to the anchor RAN a message for configuring parameters of a link of the UE at the auxiliary RAN, so that the anchor RAN transmits to the UE the message for configuring parameters of a link of the UE at the auxiliary RAN. In this embodiment, the message for configuring parameters of a link of the UE at the auxiliary RAN includes at least one of a physical layer parameter, an MAC parameter, an RLC layer parameter, and a PDCP layer parameter of the UE in the auxiliary RAN, and further includes signaling channel setting information. The second receiving unit 324 is configured to receive a link establishment response message of the UE at the auxiliary RAN as transmitted by the UE.

Figure 15:
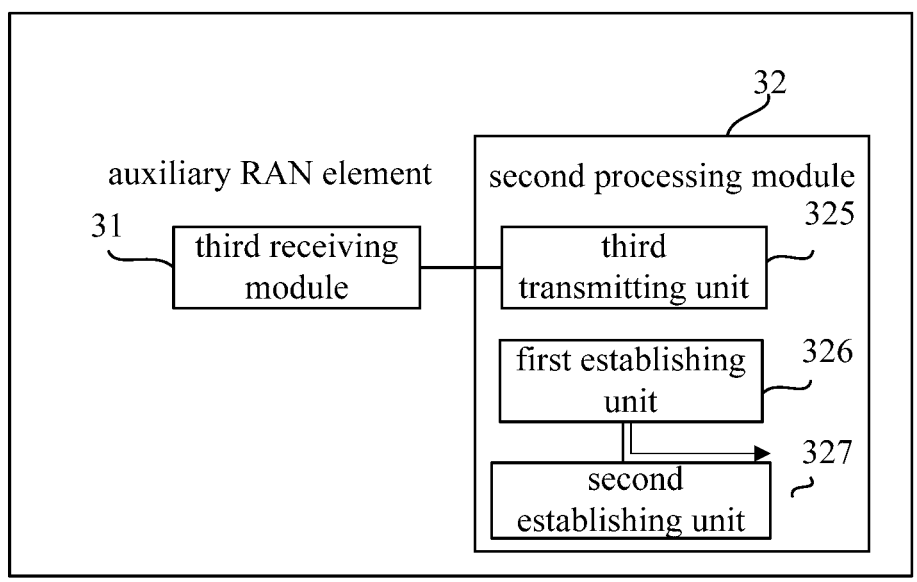
FIG. 15 is a schematic diagram exemplarily illustrating the structure of an auxiliary RAN element according to another embodiment of the present disclosure.

FIG. 15 is a schematic diagram exemplarily illustrating the structure of an auxiliary RAN element according to another embodiment of the present disclosure. In FIG. 15, the third processing module includes a third transmitting unit 325, a first establishing unit 326 and a second establishing unit 327. The third transmitting unit 325 is configured to transmit a paging message to the UE. The first establishing unit 326 is configured to establish an RRC connection with the UE. The second establishing unit 327 is connected to the first establishing unit 326 and is configured to establish a radio bearer connection with the UE after the first establishing unit 326 has established the RRC connection with the UE.

See the foregoing descriptions of the method embodiments for the working principles of the various modules of the auxiliary RAN elements as shown in FIGS. 12-15.

An embodiment of the present disclosure further provides a convergence system of a plurality of RANs, which system can include the anchor RAN element and the auxiliary RAN element as described in the foregoing embodiments. The anchor RAN element and the auxiliary RAN element can both communicate with the UE. In comparison with the prior art, this system can improve the peak rate of the UE.

As comprehensible to persons ordinarily skilled in the art, the entire or partial steps of the aforementioned method embodiments can be realized by a program that instructs relevant hardware, and the program can be stored in a computer-readable storage medium and execute the steps of the aforementioned method embodiments when executed. The storage medium includes such various media capable of storing program codes as an ROM, an RAM, a magnetic disc or an optical disc, and so on.

As should be finally explained, the aforementioned embodiments are merely employed to describe, rather than to restrict, the technical solutions of the present disclosure. Although the present disclosure is described in detail above with reference to the aforementioned embodiments, it should be made aware to persons ordinarily skilled in the art that it is still possible to modify the technical solutions recorded in the aforementioned embodiments or to equivalently replace partial technical features therein, and that such modifications or replacements do not depart the corresponding technical solutions essentially from the spirits and scopes of the technical solutions of the various embodiments according to the present disclosure.

What is claimed is:

1. A method, comprising:
   establishing, by a first radio access network device, a first connection with a terminal;
   sending, by a core network device, a first quality of service (QoS) parameter to the first radio access network device;
   sending, by the first radio access network device, to a second radio access network device, a second QoS parameter based on the first QoS parameter;
   receiving, by the second radio access network device, the second QoS parameter;
   establishing, by the second radio access network device, according to the second QoS parameter, a second connection between the terminal and the second radio access network device; and
   receiving, by the second radio access network device, an establishment response message for the second connection from the terminal directly or via the first radio access network device;
   wherein the first connection between the first radio access network device and the terminal is kept after the second connection between the terminal and the second radio access network device is established.

2. The method according claim 1, further comprising:
   receiving, by the first radio access network device, data packets from the core network device;
   splitting, by the first radio access network device, the data packets into one or more first data packets and one or more second data packets;
   transmitting, by the first radio access network device, the one or more first data packets to the terminal and the one or more second data packets to the second radio access network device; and
   transmitting, by the second radio access network device, the one or more second data packets to the terminal.

3. The method according to claim 1, wherein the establishment response message for the second connection is received by the second radio access network device from the terminal via the first radio access network device, the method further comprising:
   transmitting, by the first radio access network device, a first set of data packets including one or more data packets to the terminal, respectively, through a packet data convergence protocol (PDCP) entity being commonly used by the first radio access network device and the second radio access network device, through a radio link control (RLC) layer subblock of the first radio access network device, through a media access control (MAC) layer subblock of the first radio access network device, and through a physical (PHY) layer subblock of the first radio access network device; and
   transmitting, by the first radio access network device, a second set of data packets including one or more data packets to the second radio access network device via the PDCP entity; and
   transmitting, by the second radio access network device, the second set of data packets to the terminal, respectively, through a RLC layer subblock of the second radio access network device, through a MAC layer subblock of the second radio access network device, and through a PHY layer subblock of the second radio access network device.

4. The method according claim 3, wherein the PDCP entity being commonly used by the first radio access network device and the second radio access network device is set in the first radio access network device.

5. The method according to claim 1, wherein the establishment response message for the second connection is received by the second radio access network device directly from the terminal, the method further comprising:
   transmitting, by the first radio access network device, a third set of data packets including one or more data packets to the terminal, respectively, through a first packet data convergence protocol (PDCP) entity of the first radio access network device, through a radio link control (RLC) layer subblock of the first radio access network device, through a media access control (MAC) layer subblock of the first radio access network device, and through a physical (PHY) layer subblock of the first radio access network device;

transmitting, by the first radio access network device, a fourth second set of data packets including one or more data packets to the second radio access network device; and transmitting, by the second radio access network device, the fourth second set of data packets to the terminal, respectively, through a second PDCP entity of the second radio access network device, through a RLC layer subblock of the second radio access network device, through a MAC layer subblock of the second radio access network device, and through a PHY layer subblock of the second radio access network device, wherein the first PDCP entity and the second PDCP entity are two separate entities.

6. The method according to claim 1, further comprising: selecting, by the first radio access network device, the second radio access network device according to a measurement result of the terminal.

7. The method according to claim 6, further comprising: receiving, by the first radio access network device, one or more measurement results of candidate radio access network device or radio access capability information of the terminal for selecting the second radio access network device.

8. The method according to claim 1, wherein the first QoS parameter and the second QoS parameter are identical or different.

9. The method according to claim 1, wherein the establishing, by the second radio access network device, according to the second QoS parameter, the second connection between the terminal device and the second radio access network device comprises:

obtaining, by the second radio access network device, a parameter of a connection between the second radio access network device and the terminal according to the second QoS parameter; and sending, by the second radio access network device, a message comprising the parameter of the connection to the first radio access network device, wherein the first radio access network device is configured to send the message to the terminal.

10. A first radio access network device, comprising:
at least one memory configured to store a computer program or instructions; and
at least one processor, wherein the at least one processor is coupled to the at least one memory, and the at least one processor is configured to execute the computer program or the instructions stored in the memory, to enable the first radio access network device to perform:
establishing a first connection with a terminal;
receiving a first quality of service (QoS) parameter from a core network device;
sending, to a second radio access network device, a second QoS parameter based on the first QoS parameter for establishing a second connection between the terminal device and the second radio access network device, wherein the first connection between the first radio access network device and the terminal is kept after the second connection between the terminal and the second radio access network device is established;
receiving an establishment response message for the second connection from the terminal; and
sending the establishment response message to the second radio access network device.

11. The first radio access network device according to claim 10, wherein the computer program or the instructions, when executed by the at least one processor, further cause the first radio access network device to perform:
receiving data packets from the core network device;
splitting the data packets into one or more first data packets and one or more second data packets; and
transmitting the one or more first data packets to the terminal and the one or more second data packets to the second radio access network device to forward to the terminal.

12. The first radio access network device according to claim 10, wherein the computer program or the instructions, when executed by the at least one processor, further cause the first radio access network device to perform:
transmitting a first set of data packets including one or more data packets to the terminal, respectively, through a packet data convergence protocol (PDCP) entity being commonly used by the first radio access network device and the second radio access network device, through a radio link control (RLC) layer subblock of the first radio access network device, through a media access control (MAC) layer subblock of the first radio access network device, and through a physical (PHY) layer subblock of the first radio access network device; and
transmitting, via the PDCP entity, a second set of data packets including one or more data packets to the second radio access network device to forward to the terminal, respectively, through a RLC layer subblock of the second radio access network device, through a MAC layer subblock of the second radio access network device, and through a PHY layer subblock of the second radio access network device.

13. The first radio access network device according to claim 10, wherein the computer program or the instructions, when executed by the at least one processor, further cause the first radio access network device to perform:
selecting the second radio access network device according to a measurement result of the terminal.

14. The first radio access network device according to claim 13, wherein the computer program or the instructions, when executed by the at least one processor, further cause the first radio access network device to perform:
receiving one or more measurement results of candidate radio access network devices or radio access capability information of the terminal for selecting the second radio access network device.

15. The first radio access network device according to claim 10, wherein the first QoS parameter and the second QoS parameter are identical or different.

16. A second radio access network device, comprising:
at least one memory configured to store a computer program or instructions; and
at least one processor, wherein the at least one processor is coupled to the at least one memory, and the at least one processor is configured to execute the computer program or the instructions stored in the memory, to enable the second radio access network device to perform:
receiving, from a first radio access network device, a second quality of service (QoS) parameter that is based on a first QoS parameter received by the first radio access network device from a core network device, wherein a first connection is established between the first radio access network device and a terminal;

establishing, according to the second QoS parameter, a second connection between the second radio access network device and the terminal, wherein the first connection between the first radio access network device and the terminal is kept after the second connection between the terminal and the second radio access network device is established; and receiving an establishment response message for the second connection from the terminal directly or via the first radio access network device.

17. The second radio access network device according to claim 16, wherein establishing the second connection between the terminal device and the second radio access network device comprises:

obtaining a parameter of a connection between the second radio access network device and the terminal according to the second QoS parameter; and sending a message comprising the parameter of the connection to the first radio access network device to cause the first radio access network device to send the message to the terminal.

18. The second radio access network device according to claim 16, wherein the computer program or the instructions, when executed by the at least one processor, further cause the second radio access network device to perform:

receiving one or more second data packets from the first radio access network device, wherein the one or more second data packets are obtained by splitting data packets received by the first radio access network device from a core network device; and sending the one or more second data packets to the terminal.

19. The second radio access network device according to claim 16, wherein the establishment response message for the second connection is received by the second radio access network device directly from the terminal, and wherein the computer program or the instructions, when executed by the at least one processor, further cause the second radio access network device to perform:

receiving a first set of data packets including one or more data packets from the first radio access network device; and sending the first set of data packets to the terminal, respectively, through a physical (PHY) layer subblock of the second radio access network device, a media access control (MAC) layer subblock of the second radio access network device, a radio link control (RLC) layer subblock of the second radio access network device, and a packet data convergence protocol (PDCP) entity of the second radio access network device, wherein the PDCP entity of the second radio access network device and a PDCP entity of the first radio access network device are two separate entities.

20. The second radio access network device according to claim 16, wherein the establishment response message for the second connection is received by the second radio access network device from the terminal via the first radio access network device, and wherein the computer program or the instructions, when executed by the at least one processor, further cause the second radio access network device to perform:

receiving a second set of data packets including one or more data packets from the first radio access network device via a PDCP entity commonly used by the first radio access network device and the second radio access network device; and sending the second set of data packets to the terminal, respectively, through a physical (PHY) layer subblock of the second radio access network device, a media access control (MAC) layer subblock of the second radio access network device, a radio link control (RLC) layer subblock of the second radio access network device.

21. An apparatus, comprising:

at least one memory configured to store a computer program or instructions; and at least one processor, wherein the at least one processor is coupled to the at least one memory, and the at least one processor is configured to execute the computer program or the instructions stored in the memory, to enable the apparatus to perform:

establishing a first connection with a first radio access network device;

receiving, from the first radio access network device, a message comprising a parameter of a connection between a second radio access network device and a terminal, wherein the parameter is based on a second quality of service (QoS) parameter received from the first radio access network device, and the second QoS parameter is based on a first QoS parameter received by the first radio access network device from a core network device;

establishing a second connection between the second radio access network device and a terminal according to the message, wherein the first connection between the first radio access network device and the terminal is kept after the second connection between the terminal and the second radio access network device is established; and sending an establishment response message for the second connection to the second radio access network device directly or via the first radio access network device.

22. The apparatus according to claim 21, wherein the computer program or the instructions, when executed by the at least one processor, further cause the apparatus to perform:

reporting one or more measurement results of candidate radio access network devices and/or radio access capability information of the terminal in the candidate radio access network devices to the first radio access network device for selecting the second radio access network device.

23. The apparatus according to claim 21, wherein the computer program or the instructions, when executed by the at least one processor, further cause the apparatus to perform:

receiving one or more first data packets from the first radio access network device; and receiving one or more second data packets from the second radio access network device, wherein the one or more second data packets are received by the second radio access network device from the first radio access network device to forward to the terminal, wherein data packets from a core network are split by the first radio access network device into the one or more first data packets and the one or more second data packets.

24. The apparatus according to claim 21, wherein the establishment response message for the second connection is received by the second radio access network device directly from the terminal, and wherein the computer program or the instructions, when executed by the at least one processor, further cause the apparatus to perform:

receiving a first set of data packets including one or more data packets from the first radio access network device, respectively, through a physical (PHY) layer subblock of the first radio access network device, a media access control (MAC) layer subblock of the first radio access network device, a radio link control (RLC) layer subblock of the first radio access network device, and a first packet data convergence protocol (PDCP) entity of the first radio access network device; and receiving a second set of data packets including one or more data packets from the second radio access network device, respectively, through a PHY layer subblock of the second radio access network device, through a MAC layer subblock of the second radio access network device, through an RLC layer subblock of the second radio access network device, and through a second PDCP entity of the second radio access network device, wherein the first PDCP entity and the second PDCP entity are separate entities.

25. The apparatus according to claim 21, wherein the second connection includes a direct signaling connection between the terminal and the second radio access network device.

26. The apparatus according to claim 21, wherein the establishment response message for the second connection is received by the second radio access network device from the terminal via the first radio access network device, and wherein the computer program or the instructions, when executed by the at least one processor, further cause the apparatus to perform:

receiving a third set of data packets including one or more data packets from the first radio access network device, respectively, through a physical (PHY) layer subblock of the first radio access network device, a media access control (MAC) layer subblock of the first radio access network device, a radio link control (RLC) layer subblock of the first radio access network device, and a packet data convergence protocol (PDCP) entity commonly used by the first radio access network device and the second radio access network device; and receiving a fourth set of data packets including one or more data packets from the second radio access network device, respectively, through a PHY layer subblock of the second radio access network device, through a MAC layer subblock of the second radio access network device, through an RLC layer subblock of the second radio access network device.

\* \* \* \* \*

UNITED STATES PATENT AND TRADEMARK OFFICE
CERTIFICATE OF CORRECTION

PATENT NO. : 11,758,429 B2  
APPLICATION NO. : 17/539918  
DATED : September 12, 2023  
INVENTOR(S) : Li et al.

Page 1 of 1

It is certified that error appears in the above-identified patent and that said Letters Patent is hereby corrected as shown below:

On the Title Page

Page 2: Item (56) U.S. Patent Documents, Left-Hand Column, Line 1: "Mrtanen et al." should read -- Virtanen et al. --.

Signed and Sealed this  
Second Day of January, 2024

Katherine Kelly Vidal  
*Director of the United States Patent and Trademark Office*